US011945351B2

(12) United States Patent
Ng et al.

(10) Patent No.: US 11,945,351 B2
(45) Date of Patent: Apr. 2, 2024

(54) SEAT ADJUSTMENT DEVICE FOR A FLEXIBLE SEAT FRAME AND METHOD OF USE

(71) Applicant: Adient US LLC, Plymouth, MI (US)

(72) Inventors: Xin Wei Jolene Ng, Singapore (SG); Joseph Gasko, Commerce Township, MI (US); Reinier Soliven, Oakland Township, MI (US)

(73) Assignee: Adient US LLC, Plymouth, MI (US)

( * ) Notice: Subject to any disclaimer, the term of this patent is extended or adjusted under 35 U.S.C. 154(b) by 12 days.

(21) Appl. No.: 17/663,693

(22) Filed: May 17, 2022

(65) Prior Publication Data

US 2022/0371491 A1    Nov. 24, 2022

Related U.S. Application Data

(60) Provisional application No. 63/190,296, filed on May 19, 2021.

(51) Int. Cl.
 *B60N 2/66* (2006.01)
(52) U.S. Cl.
 CPC .................. *B60N 2/6671* (2015.04)
(58) Field of Classification Search
 CPC ............... B60N 2/6671; B60N 2/667
 USPC ................. 297/284.4, 284.6, 284.9
 See application file for complete search history.

(56) References Cited

U.S. PATENT DOCUMENTS

| 4,589,695 A * | 5/1986 | Isono | A47C 7/029 297/284.6 |
| 4,951,334 A * | 8/1990 | Maier | A61G 5/1043 297/452.21 |
| 5,507,559 A * | 4/1996 | Lance | B60N 2/6671 297/284.4 |
| 5,868,466 A * | 2/1999 | Massara | B60N 2/665 297/284.6 |
| 7,841,662 B2 * | 11/2010 | Samain | F16C 1/22 297/284.7 |
| 7,918,506 B2 * | 4/2011 | Hsiao | A47C 7/462 297/284.3 |
| 8,474,908 B2 * | 7/2013 | Petzel | B60N 2/665 297/284.3 |
| 9,596,941 B1 * | 3/2017 | Romero | A47C 7/402 |
| 2003/0006636 A1 * | 1/2003 | Ligon, Sr. | A47C 7/465 297/284.4 |
| 2005/0184568 A1 * | 8/2005 | Schmidt | A47C 7/465 297/284.4 |
| 2014/0265493 A1 * | 9/2014 | Machael | A47C 7/445 297/285 |

FOREIGN PATENT DOCUMENTS

GB          2335845 A * 10/1999 ............... B60N 2/66

* cited by examiner

*Primary Examiner* — Milton Nelson, Jr.
(74) *Attorney, Agent, or Firm* — Marshall & Melhorn, LLC

(57) ABSTRACT

A seat system for a vehicle including a flexible seatback structure and an adjustment device coupled thereto. The adjustment device is configured to alter a contour of a seating surface of the seatback structure by causing at least a portion of the seatback structure to move toward or away from the occupant of the seat system. The adjustment device includes at least one actuating element connected to a side portion of the seatback structure and an actuator.

13 Claims, 8 Drawing Sheets

SEAT ADJUSTMENT DEVICE FOR A FLEXIBLE SEAT FRAME AND METHOD OF USE

FIELD

The presently disclosed subject matter relates to a seat system, and more particularly to an adjustment device for a flexible seat member and method of use.

BACKGROUND

Conventional seat systems comprise a seatback assembly and a seat base assembly. Each of the assemblies typically include cushions having bolsters. Conventional bolsters, however, only provide a localized change to the contour of the seatback assembly and the seat base assembly. They do not provide for an increased bolster contour. As a result, the seatback assembly and the seat base assembly, each have an interrupted contour and cushion contour with localized pressure points.

Seat systems that have adjustment devices for their various features are well-known. The adjustment device may be such as for comfort and/or positioning of a seat occupant. Often, however, the adjustment devices are overly complicated, heavy and unreliable. Further, the known seat adjustment devices may not provide the type or degree of adjustability desired by today's seat occupant.

In view of the disadvantages associated with the prior art, it would be advantageous for an adjustment device for a seat system to be simple, lightweight, highly reliable and capable of providing a wide range of types and degrees of adjustment to satisfy the subjective preferences of many different sizes, shapes, and types of occupants.

SUMMARY

In concordance and agreement with the present disclosure, an adjustment device for a seat system which is simple, lightweight, highly reliable and capable of providing a wide range of types and degrees of adjustment to satisfy the subjective preferences of many different sizes, shapes, and types of occupants, has surprisingly been discovered.

In one embodiment, an adjustment device for a seat system, comprises: at least one actuating element connected to a side portion of a flexible member, wherein the adjustment device is configured to alter a contour of a seating surface of the seat system.

As aspects of certain embodiments, the seating surface is configured to engage at least a lumbar portion of an occupant of the seat system.

As aspects of certain embodiments, the adjustment device is actuated such that the at least one actuating element moves a portion of said flexible member in one or more of an inward direction toward an occupant of the seat system and an outward direction away from the occupant of the seat system.

As aspects of certain embodiments, the portion of the flexible member is a lateral portion defining a bolster of the seat system.

As aspects of certain embodiments, the flexible member is formed from a thermoplastic elastomer.

As aspects of certain embodiments, the flexible member is a single, integrally formed, one-piece structure.

As aspects of certain embodiments, the at least one actuating element is at least one of a cable, a string, a wire, and a chain.

As aspects of certain embodiments, the at least one actuating element is coupled to the side portion by a spool.

As aspects of certain embodiments, the at least one actuating element is connected to a coupling mechanism and another actuating element.

As aspects of certain embodiments, the at least one actuating element is coupled to a rib of the flexible member.

As aspects of certain embodiments, the at least one actuating element is coupled to a tab of the flexible member.

As aspects of certain embodiments, at least a portion of the at least one actuating element is disposed within a conduit.

As aspects of certain embodiments, the flexible member is a seatback structure of the seat system.

As aspects of certain embodiments, the adjustment device is connected to an actuator, wherein activation of the actuator causes the adjustment device to alter the contour of the seating surface of the flexible member.

As aspects of certain embodiments, the actuator is directly connected to the at least one actuating element.

As aspects of certain embodiments, the adjustment device further includes a coupling mechanism connected to the at least one actuating element, and wherein the actuator is connected to the coupling mechanism by another actuating element.

In another embodiment, a seat system for a vehicle, comprises: a seat frame; a seatback structure coupled to the seat frame; an adjustment device coupled to the seat system, the adjustment device including a first actuating element and a second actuating element, wherein each of the first actuating element and the second actuating element is coupled to a side portion of the seatback structure, and wherein the adjustment device is configured to alter a contour of a seating surface of the seatback structure; and an actuator connected to the adjustment device.

As aspects of certain embodiments, at least one of the first actuating element and the second actuating element is directly connected to the actuator.

As aspects of certain embodiments, the adjustment device further includes a coupling mechanism, wherein the coupling mechanism is connected to the actuator by a third actuating element.

In yet another embodiment, a method of adjusting a seat system, comprises: providing a seat frame, a flexible member coupled to the seat frame, an adjustment device coupled to the seat system, the adjustment device including at least one actuating element coupled to a side portion of the flexible member, and an actuator connected to the adjustment device; and activating the actuator move the adjustment device and alter a contour of a seating surface of the flexible member.

BRIEF DESCRIPTION OF THE DRAWINGS

The advantages of the seat adjustment device and method of use will become readily apparent to those skilled in the art from the following detailed description when considered in the light of the accompanying drawings in which.

DETAILED DESCRIPTION

It is to be understood that the device and method may assume various alternative orientations and step sequences, except where expressly specified to the contrary. It is also to be understood that the specific devices and processes illustrated in the attached drawings, and described in the following specification are simply exemplary embodiments of the concepts defined herein. Hence, specific dimensions, directions or other physical characteristics relating to the embodiments disclosed are not to be considered as limiting, unless expressly stated otherwise.

Figure 1:
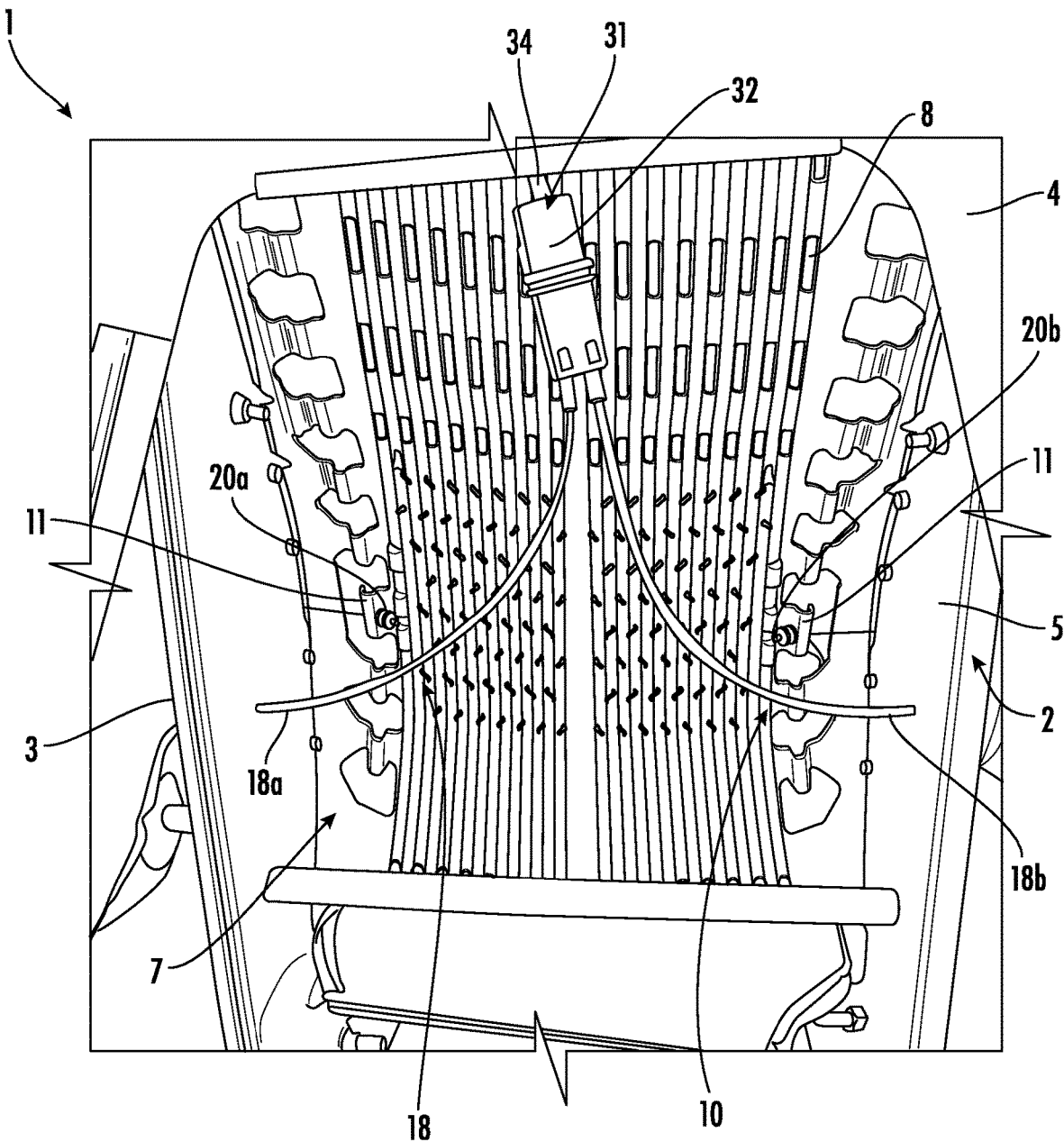
FIG. 1 is a rear view of one embodiment of an adjustment device for a seat system.

FIG. 1 is a partial perspective view of a seat system 1. The seat system 1 may comprise a seat frame 2, a seat base structure (not depicted), and a seatback structure 7. The seat frame 2 may extend entirely, or partially, about the seat base structure and the seatback structure 7. The seat frame 2 may be constructed of a single piece, or two or more pieces, which may be connected together. In one embodiment, the seat frame 2 may be constructed of a robust material, such as metal, which may include steel, but other materials, such as composites, plastics, and/or fiberglass may be used.

A seat base portion (not depicted) the seat frame 2 may be directly or indirectly connected to the ground or a vehicle framework (not depicted) and/or a seatback portion 4 of the seat frame 2. The connection between the ground or the vehicle framework and/or the seatback portion 4 of the seat frame 2 may be such that relative movement is permitted.

The seat base portion of the seat frame 2 may entirely or substantially entirely enclose or surround a seat base center section (not depicted). In one embodiment, the seat base center section of the seat base portion may be substantially open where the seat frame 2 defines a perimeter of the seat base center section. The seat base structure may extend partially or entirely across the seat base center section of the seat base portion. In these embodiments, the seat base structure may extend from a front portion of the seat frame 2 to a rear portion of the seat frame 2 and from one side of the seat frame 2 to the other side of the seat frame 2.

Similarly, the seatback portion 4 of the seat frame 2 may entirely or substantially entirely enclose or surround a seatback center section 6. In one embodiment, the seatback center section 6 of the seatback portion may be substantially open where the seat frame 2 defines a perimeter of the seatback center section 6. The seatback structure 7 may extend partially or entirely across the seat base center section 6 of the seatback portion. In these embodiments, the seatback structure 7 may extend from an upper portion of the seat frame 2 to a lower portion of the seat frame 2 and from one side of the seat frame 2 to the other side of the seat frame 2.

Each of the seat base structure and the seatback structure 7 may be constructed without any apertures 8, but it may be preferred to provide a plurality of apertures 8 formed therein to assist with certain aspects of comfort, shape, conformability and flexibility. The apertures 8 may have different shapes and sizes, as shown the figures to provide the above-noted aspects. At least a portion of the seat base structure and/or the seatback structure 7 without apertures 8 may be connected in whole or in part to the seat frame 2.

The seat base structure may include a seat base structure surface for engaging and supporting at least a buttock portion and a leg portion of a user. The seat base structure may be connected to the seatback structure 7. The seatback structure 7 may include a seatback structure surface 9. The seatback structure surface 9 engages at least a lumbar portion and a shoulder portion of the user. The seat base structure and the seatback structure 7 may be constructed partially or entirely of a variety of materials including plastics, composites, fiberglass, and/or rubber compounds. Further, each of the seat base structure and the seatback structure 7 may be partially or entirely constructed of metal, such as in the form of coil and/or leaf springs, or other biasing structures. Most any material capable of providing a memory elastic function or partial memory elastic function may be preferred. In one embodiment, each of the seat base structure 3 and the seatback structure 7 may be a flexible member preferably formed of thermoplastic elastomers (TPE). The seat base structure may be formed in one-piece to provide an integrally formed one-piece seat base structure. The seatback structure 7 may be formed in one-piece to provide an integrally formed one-piece seatback structure 7.

In certain embodiments, the seatback center portion 6 of the seatback structure 7 may be bounded at least partially on by side portions 3, 5 of the seatback portion 4. As shown in the figures, the side portions 3, 5 may be substantially the same as one another, and in some cases, the seatback structure 7 may be symmetrical about a vertically extending centerline. The side portions 3, 5 may be connected to the seatback center portion 6 through one or more tabs 11 on each side, wherein the apertures 8 separate the tabs 11. The tabs 11 on a side of the seatback structure 7 may be equally or unequally spaced from one another and/or be of different shapes to provide different or varying degrees of flexibility to the seatback center portion 6.

The side portions 3, 5 may be angled with respect to the seatback portion 4. In one example, the side portions 3, 5 may generally extend from the seatback portion 4 between 45 and 90 degrees.

The width of the side portions 3, 5 may vary along their length. In one embodiment, the side portions 3, 5 taper down from a lower portion of the seatback center portion 6 to an upper portion of the seatback center portion 6.

Figure 2:
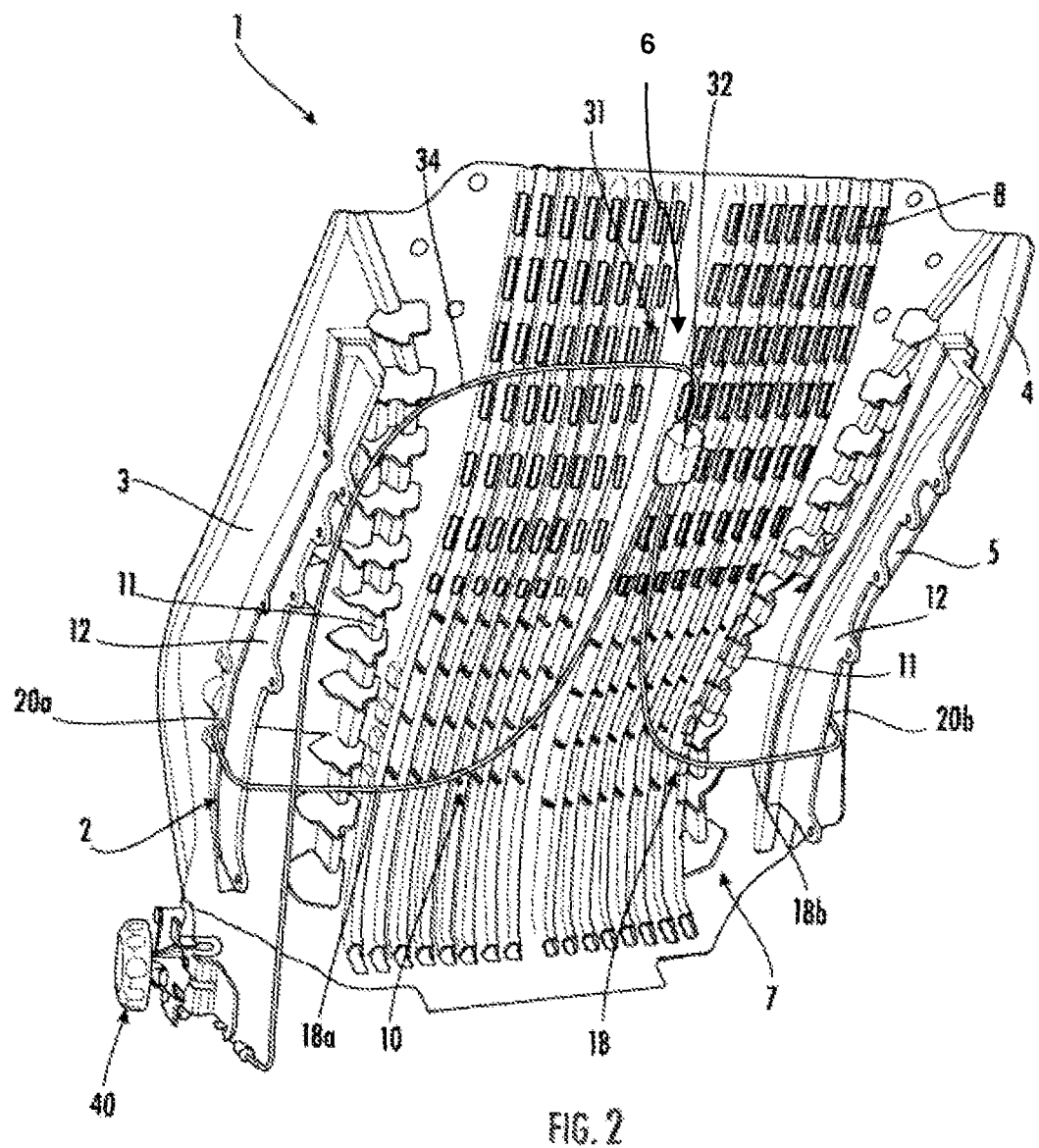
FIG. 2 is a rear perspective view of the adjustment device of FIG. 1.

In some embodiments, a reinforcing rib 12 may extend along each side portion 3, 5. As shown in FIG. 2, for example, the reinforcing ribs 12 may extend substantially from the lower portion of each side portion 3, 5 to an upper portion of each side portion 3, 5. The ribs 12 may extend parallel or somewhat parallel the primary direction of the seatback center portion 6.

The ribs 12 may be curved in order to adapt to the curvature of the side portions 3, 5 and the seatback center portion 6. Further, the ribs 12 may be equipped with fingers (not depicted) that may be used to connect with complementary features on the side portions 3, 5 to hold the ribs 12 in place. In some embodiments, each rib 12 may assist its respective side portion 3, 5 to selectively move, or even resist movement, in a uniform manner. The ribs 12 may also be designed to have different degrees of flexure along their length where different degrees of support may be needed along the length of the ribs 12.

As best seen in FIGS. 1 and 2, the seat system 1 may further comprise at least one adjustment device 10. The at least one adjustment device 10 may be employed to adjust at least a portion of at least one of the seat base structure and the seatback structure 7. For simplicity, only the at least one adjustment device 10 employed with the seatback structure 7 is described hereinafter. It should be appreciated, however, that the at least one adjustment device 10 may be employed with the seat base structure, if desired.

In certain embodiments, the adjustment device 10 may comprise at least one actuating element 18 (e.g. a cable, a string, a wire and/or a chain). Various materials may be employed to produce the at least one actuating element 18. As a non-limiting example, the at least one actuating element 18 may be a braided metal cable.

Figure 3:
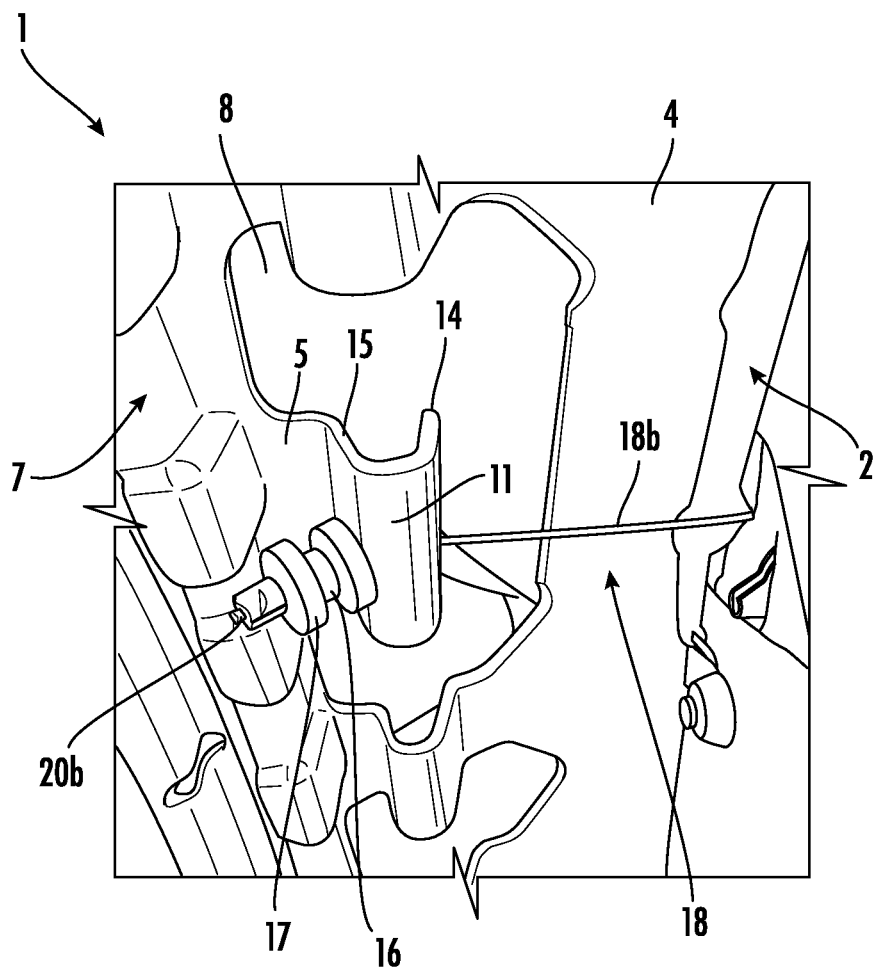
FIG. 3 is a detail view of one embodiment of a component of the adjustment device of FIG. 1.
Figure 4:
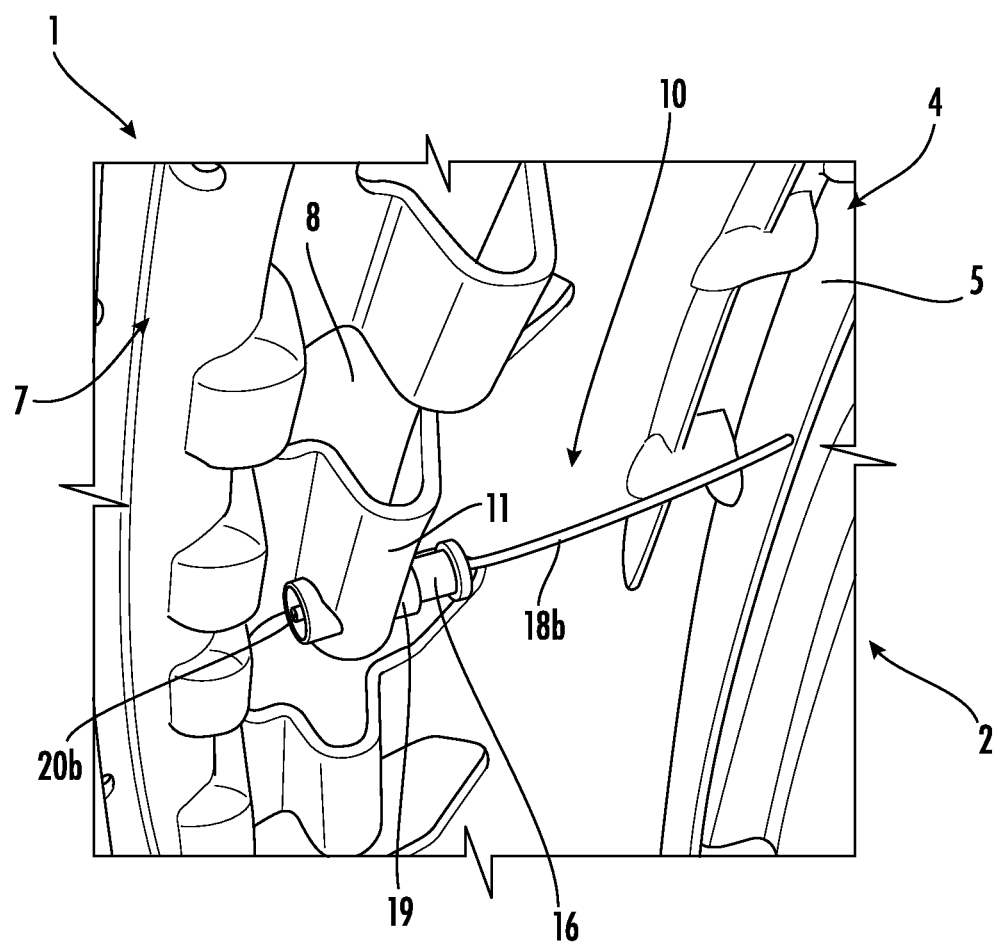
FIG. 4 is a detail view of another embodiment of a component of the adjustment device of FIG. 1
Figure 5:
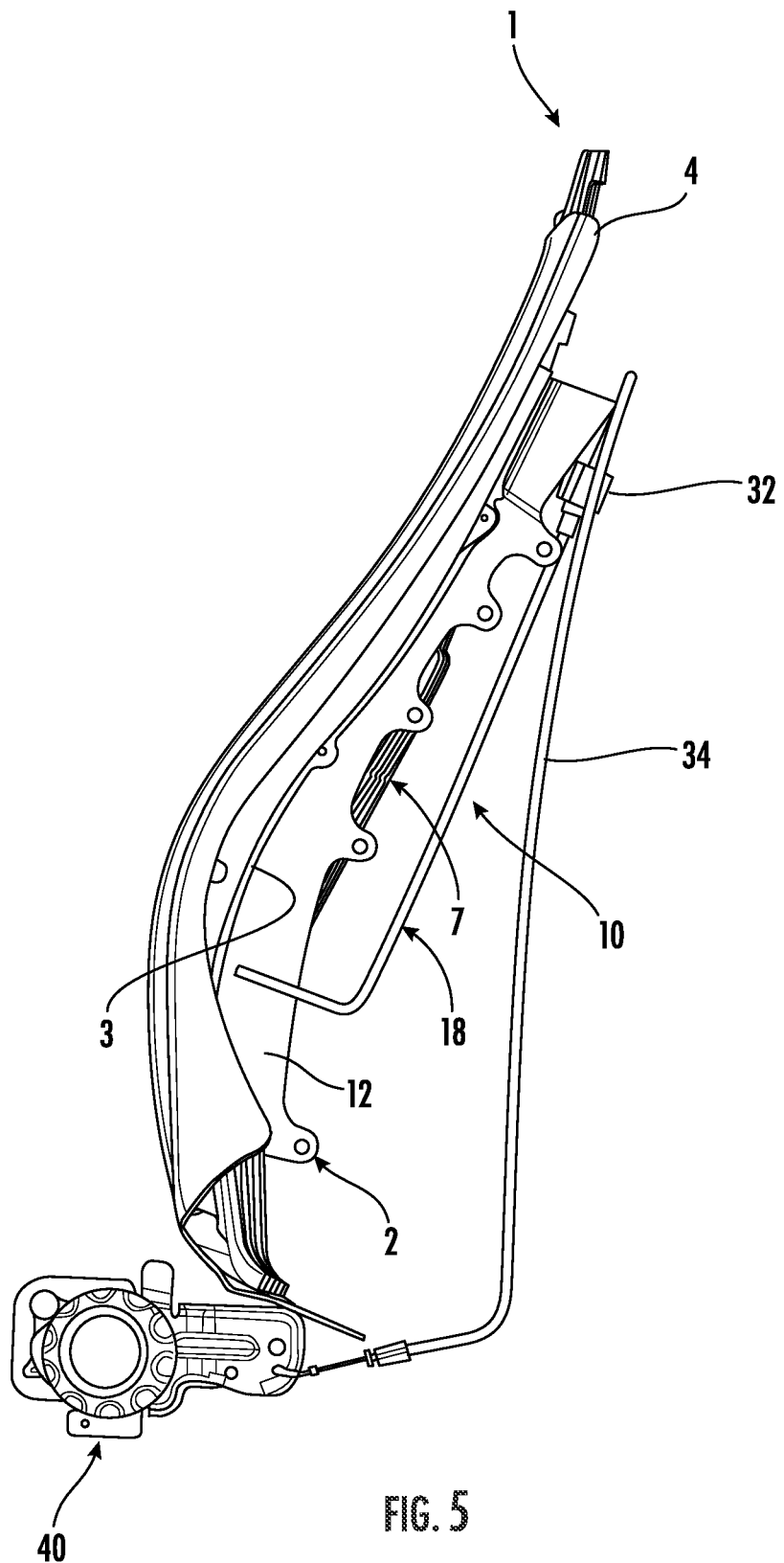
FIG. 5 is a side view of the seat adjustment device top, cross-sectional view through the seat adjustment device of FIG. 1.

In certain embodiments, a corresponding end 20a, 20b of each of the actuating elements 18a, 18b may be secured to a respective one of the ribs 12 and/or to one or more tabs 11 of the side portions 3, 5. FIG. 2 depicts one embodiment where the ends 20a, 20b of the actuating elements 18a, 18b may be connected to each of the ribs 12. FIGS. 3 and 4 depict another embodiment where the ends 20a, 20b may be connected to one of the tabs 11. FIG. 3 shows the embodiment where one end 14 of the tab 11 is not connected to the seatback center portion 6. Instead, the other end 15 of the tab 11 is connected to the side portion 5. In this instance, the device functions largely the same as if the tab 11 were fully connected to the seatback center portion 6, such as depicted in FIG. 4.

In both FIGS. 3 and 4, a spool 16 is connected to the ends 20a, 20b of the actuating elements 18a, 18b. The spool 16 may have one or more protuberances 17 that have a diameter larger than an opening needed for the actuating elements 18a, 18b to extend through the tab 11. The spool 16 is thus prevented from being inadvertently pulled through the opening and separated from the tab 11. The spool 16, however, has sufficient surface area contact with the tab 11 so that any push/pull forces are transferred from the actuating elements 18a, 18b to the tab 11.

Figure 6:
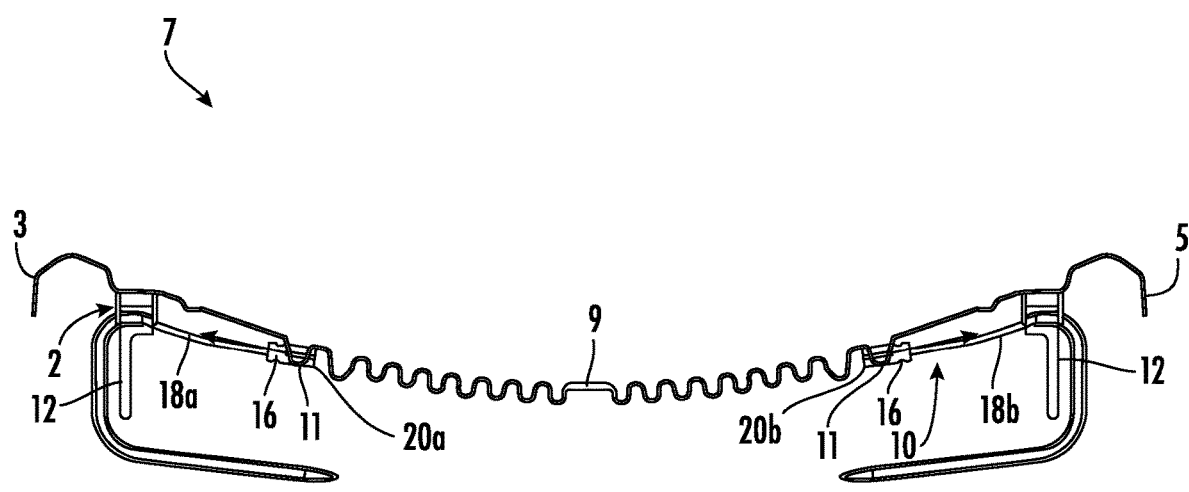
FIG. 6 is a sectional view taken through line A-A of FIG. 5.

In another embodiment shown in FIGS. 4 and 6, the spool 16 may be formed into the seatback structure 7, such as integrally formed with the tab 11, for example. As a non-limiting example, the spool 16 may be received within a molded snap feature 19 of the tab 11 that permits the spool 16 to be snapped and held in place on the tab 11.

Figure 7:
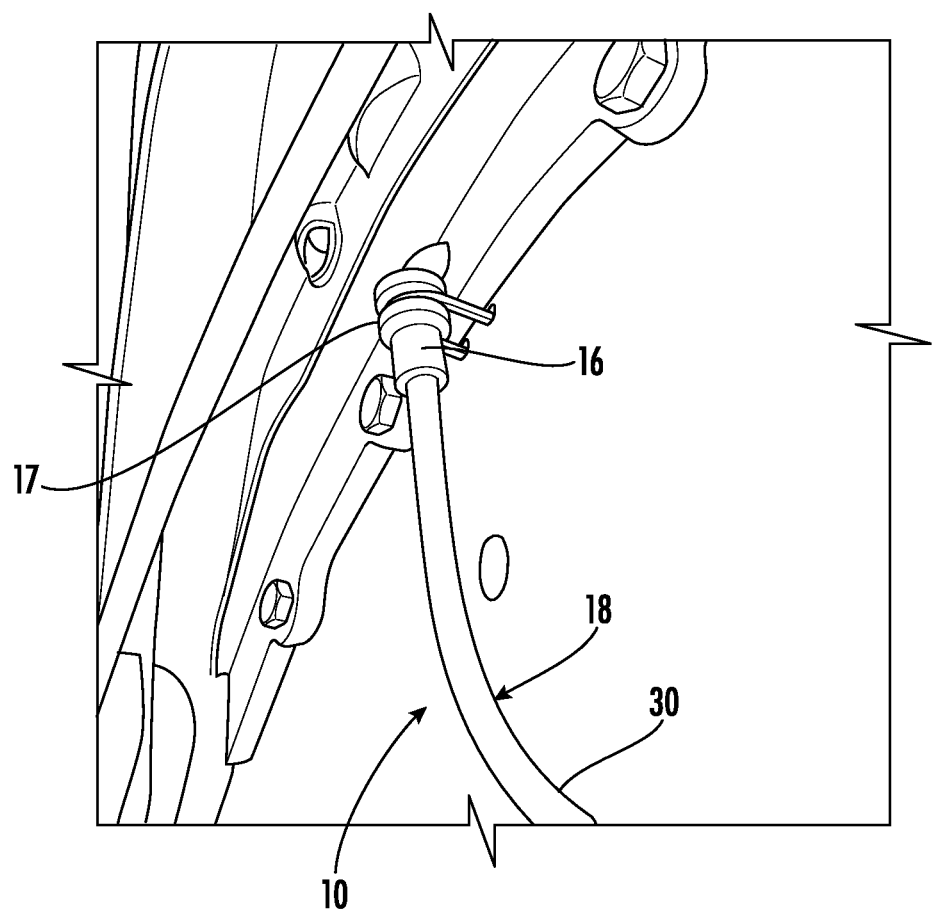
FIG. 7 is a detail view of another embodiment of a component of the seat adjustment device.
Figure 8:
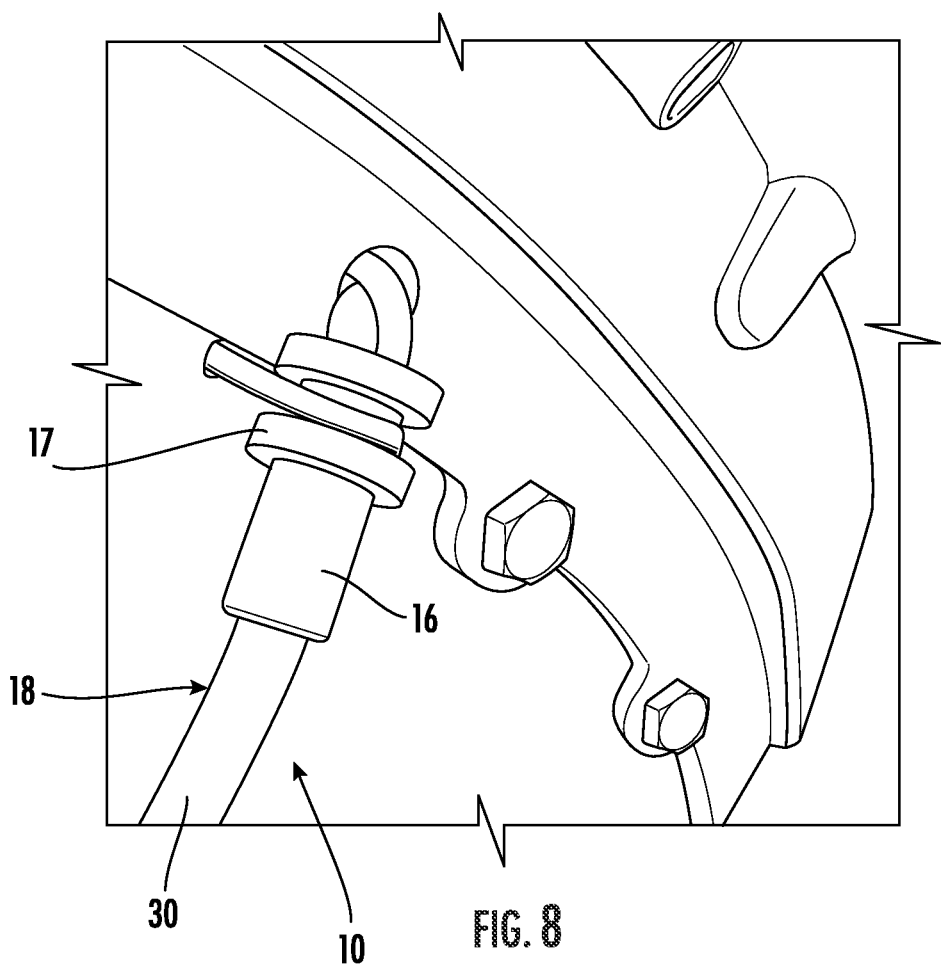
FIG. 8 is another view of the component in FIG. 7.

FIGS. 7 and 8 depict another embodiment of the spool 16. In addition, FIGS. 7 and 8 depict the at least one actuating element 18 may be disposed in a conduit 30. In certain embodiments, each of the actuating elements 18a, 18b is disposed in a respective conduit 30a, 30b. Each of the conduits 30a, 30b may be a tubular-like structure that at least partially houses the respective one of the actuating elements 18a, 18b therein. The actuating elements 18a, 18b may extend at least partially through the conduits 30a, 30b along the seat frame 2, but the actuating elements 18a, 18b and the conduits 30a, 30b may be routed in other locations. The conduits 30a, 30b may help to protect the actuating elements 18a, 18b, and may be configured to help the actuating elements 18a, 18b selectively slide therein. Thus, in some cases, a lubricant or other similar material (not depicted) may be located on the actuating elements 18a, 18b and/or within the conduits 30a, 30b.

The conduits 30a, 30b, with the actuating elements 18a, 18b located therein, may extend from each of the side portion 3, 5, where it may be routed to a central location 31. In the depicted embodiment, the central location 31 may be behind the seatback structure 7 and the seatback portion 4 of the seat frame 2. FIG. 2 shows the central location 31 in an area approximately centered on the seatback structure 3, however, other locations are permissible.

Regardless where the central location 31 is positioned, it may be preferred to have a coupling mechanism 32 located there. The coupling mechanism 32 may be a mechanical or electro-mechanical device that mechanically or electro-mechanically connects the actuating elements 18a, 18b to a single actuating element 34. The single actuating element 34 may then extend to an actuator 40. While the coupling mechanism 32 may be employed in certain embodiments, one is not required in all embodiments. Instead, the actuating elements 18a, 18b extending from each of the side portions 3, 5 may extend directly to the actuator 40.

The actuator 40 may be a manually operated device, and/or an electro-mechanical device (such as a motor), that is configured to push and pull at least one of the actuating elements 18a, 18b, 34 when actuated. It maybe preferred that the actuator 40 has a lock feature (not depicted) that prevents the at least one of the actuating elements 18a, 18b, 34 from moving unless the actuator 40 may be specifically engaged to push or pull on the at least one of the actuating elements 18a, 18b, 34. The actuator 40 may be located on or near the seat frame 2.

It may be appreciated that when the at least one of the actuating elements 18a, 18b, 34 are pulled by the actuator 40, as schematically depicted in FIG. 6 by the arrows, the side portions 3, 5 of the seatback structure 7 may be pulled taut or at least tauter than it was before being activation of the actuator 40. The actuating elements 18a, 18b act on the flexible seatback structure 7, or more particularly the outboard side portions 3, 5, to urge them forward, and thus, at least a portion of the seatback structure 7 moves in a first direction towards the occupant of the seat system 1.

This has the effect of removing any gaps between the seatback structure 7 (which may include the cushioning thereon) and the occupant. As the seatback structure 7 moves forward in the first direction, it will contact the occupant and the occupant may also be urged forward in the first direction. If the actuating elements 18a, 18b are secured in the locations depicted in the figures, the seatback structure 7 may function to provide lumbar support to the occupant. If the actuating elements 18a, 18b, are secured in a different location or various other locations, they may function to conform or relax portions of the seatback structure 7 in those locations. In certain embodiments, the adjustment device 10 is employed to provide the occupant with an increased support, which changes the contour of the seatback structure surface 9.

It may be appreciated that the actuating elements 18a, 18b, 34 can be relaxed and the seatback structure 7 may move in an opposite second direction away from the occupant and return to its original, or partially original, position. This may be through the weight of the occupant in the seat system 1, by biasing members (e.g. springs) associated with the adjustment device 10, or by the seatback structure 7 and/or the actuating elements 18a, 18b, 34 being rigid enough to push the side portions 3, 5 into a location or position. Such functionality may have the effect of reducing pressure or pressure points from the seat system 1 on the occupant.

It may be that only a single actuating element 18 is used. The single actuating element 18 can be located within a conduit 30 or without. The single actuating element 18 may be similarly supported on the seatback portion 4 of the seat frame 2, and extend across at least a portion of the seatback structure 7. The single actuating element 18 may be similarly connected to the actuator 40 to function in the same or similar manner as described above.

In some cases, a cushioning material (not depicted) may be applied in whole or in part to the seat frame 2, the seat base structure, and/or the seatback structure 7. The cushioning material provides a soft, cushioning material between the occupant and the seat base structure, the seatback structure 7, and/or the seat frame 2. A covering material (not depicted), such as a fabric or leather material, may extend over the cushioning material to provide additional comfort features and to also provide aesthetic value to the seat system 1. The covering material may also extend over and enclose the actuating elements 18a, 18b, the spools 16, and/or the coupling mechanism 32.

In accordance with the provisions of the patent statutes, the present device and method have been described in what is considered to represent its preferred embodiments. However, it should be noted that the device and method can be practiced otherwise than as specifically illustrated and described without departing from its spirit or scope.

What is claimed is:

1. An adjustment device for a seat system, comprising: at least one actuating element connected to a side portion of a flexible member, wherein the adjustment device is configured to alter a contour of a seating surface of the seat system,
    wherein the flexible member is a seatback structure that is symmetrical about a vertical axis and is adapted to engage at least a lumbar portion and a shoulder portion of an occupant on the seating surface,
    wherein the flexible member is a single, integrally formed, one-piece structure formed from a thermoplastic elastomer,
    wherein the at least one actuating element is a cable disposed within a conduit,
    wherein the at least one actuating element is connected to a coupling mechanism and another actuating element.

2. The adjustment device according to claim 1, wherein the adjustment device is actuated such that the at least one actuating element moves a portion of said flexible member in one or more of an inward direction toward an occupant of the seat system and an outward direction away from the occupant of the seat system.

3. The adjustment device according to claim 2, wherein the portion of the flexible member is a lateral portion defining a bolster of the seat system.

4. The adjustment device according to claim 1, wherein the at least one actuating element is coupled to the side portion by a spool.

5. The adjustment device according to claim 1, wherein the at least one actuating element is coupled to a rib of the flexible member.

6. The adjustment device according to claim 1, wherein the at least one actuating element is coupled to a tab of the flexible member.

7. The adjustment device according to claim 1, wherein the adjustment device is connected to an actuator, wherein activation of the actuator causes the adjustment device to alter the contour of the seating surface of the flexible member.

8. The adjustment device according to claim 7, wherein the actuator is directly connected to the at least one actuating element.

9. The adjustment device according to claim 8 wherein the actuator is connected to the coupling mechanism by another actuating element.

10. A seat system for a vehicle, comprising:
    a seat frame;
    a seatback structure coupled to the seat frame;
    an adjustment device coupled to the seat system, the adjustment device including a first actuating element and a second actuating element, wherein each of the first actuating element and the second actuating element is coupled to a side portion of the seatback structure, and wherein the adjustment device is configured to alter a contour of a seating surface of the seatback structure; and
    an actuator connected to the adjustment device,
    wherein the seatback structure is symmetrical about a vertical axis and is adapted to engage at least a lumbar portion and a shoulder portion of an occupant on the seating surface,
    wherein the seatback structure is a single, integrally formed, one-piece structure formed from a thermoplastic elastomer,
    wherein each of the actuating elements is a cable disposed within a conduit.

11. The seat system according to claim 10, wherein at least one of the first actuating element and the second actuating element is directly connected to the actuator.

12. The seat system according to claim 10, wherein the adjustment device further includes a coupling mechanism, wherein the coupling mechanism is connected to the actuator by a third actuating element.

13. A method of adjusting a seat system, comprising:
    providing a seat frame, a flexible member coupled to the seat frame, an adjustment device coupled to the seat system, the adjustment device including at least one actuating element connected to a spool located in a rib or a tab in a side portion of a flexible member, and an actuator connected to the adjustment device; and
    activating the actuator to move the adjustment device so that the spool pushes or pulls the rib or tab to alter a contour of a seating surface of the flexible member,
    wherein the flexible member is a seatback structure that is symmetrical about a vertical axis and is adapted to engage at least a lumbar portion and a shoulder portion of an occupant on the seating surface,
    wherein the flexible member is a single, integrally formed, one-piece structure formed from a thermoplastic elastomer,
    wherein the at least one actuating element is a cable disposed within a conduit.

* * * * *